United States Patent
Hofrichter

(10) Patent No.: US 8,807,327 B2
(45) Date of Patent: Aug. 19, 2014

(54) TRANSFER APPARATUS WITH DYNAMICALLY VARIABLE DRIVE ZONES

(75) Inventor: Johann Hofrichter, Schmidgaden (DE)

(73) Assignee: Siemens Aktiengesellschaft, München (DE)

( * ) Notice: Subject to any disclaimer, the term of this patent is extended or adjusted under 35 U.S.C. 154(b) by 601 days.

(21) Appl. No.: 12/556,138

(22) Filed: Sep. 9, 2009

(65) Prior Publication Data

US 2010/0059339 A1 Mar. 11, 2010

(30) Foreign Application Priority Data

Sep. 9, 2008 (EP) ..................................... 08015870

(51) Int. Cl.
*B65G 35/00* (2006.01)

(52) U.S. Cl.
USPC ......................................................... 198/619

(58) Field of Classification Search
USPC ......................................................... 198/619
See application file for complete search history.

(56) References Cited

U.S. PATENT DOCUMENTS

| | | | | |
|---|---|---|---|---|
| 3,666,080 | A * | 5/1972 | Alfredsson | 198/350 |
| 3,878,933 | A * | 4/1975 | Bauer et al. | 198/350 |
| 4,135,120 | A * | 1/1979 | Hoshimi et al. | 318/400.04 |
| 5,023,495 | A * | 6/1991 | Ohsaka et al. | 310/12.15 |
| 5,086,729 | A * | 2/1992 | Katagiri | 118/729 |
| 5,289,983 | A * | 3/1994 | Ueda et al. | 242/473.5 |
| 5,295,570 | A * | 3/1994 | Grecksch et al. | 198/465.1 |
| 5,610,491 | A * | 3/1997 | Gotz et al. | 318/625 |
| 5,749,454 | A * | 5/1998 | Layne | 198/464.4 |
| 5,845,864 | A * | 12/1998 | Hermanns et al. | 242/474.1 |
| 5,880,586 | A * | 3/1999 | Dukart et al. | 324/207.2 |
| 5,959,430 | A * | 9/1999 | Yuki et al. | 318/805 |
| 5,965,963 | A * | 10/1999 | Chitayat | 310/12.01 |
| 6,118,245 | A * | 9/2000 | Sienz et al. | 318/687 |
| 6,213,282 | B1 * | 4/2001 | Mokler et al. | 198/415 |
| 6,453,543 | B1 * | 9/2002 | Tinner et al. | 29/607 |
| 6,459,224 | B2 * | 10/2002 | Itoh et al. | 318/445 |
| 6,502,517 | B1 * | 1/2003 | Groening et al. | 104/281 |
| 6,803,681 | B2 * | 10/2004 | Faizullabhoy et al. | 310/12.19 |
| 6,804,880 | B2 * | 10/2004 | Yamamoto | 29/700 |
| 6,951,274 | B2 * | 10/2005 | Zeitler et al. | 198/890 |
| 7,385,363 | B2 * | 6/2008 | Schemm | 318/135 |
| 7,456,593 | B1 * | 11/2008 | Floresta et al. | 318/135 |
| 7,589,482 | B2 * | 9/2009 | Sepe, Jr. | 318/135 |
| 7,597,187 | B2 * | 10/2009 | Bausenwein et al. | 198/619 |
| 7,635,245 | B2 * | 12/2009 | Kaneko | 414/280 |

(Continued)

FOREIGN PATENT DOCUMENTS

| | | |
|---|---|---|
| DE | 101 50 318 A1 | 4/2003 |
| DE | 101 50 319 C1 | 5/2003 |

(Continued)

*Primary Examiner* — Joseph Dillon, Jr.
(74) *Attorney, Agent, or Firm* — Henry M Feiereisen LLC

(57) ABSTRACT

A transfer apparatus includes a primary part, and at least one first and one second secondary part, which are each magnetically coupled to the primary part for drive purposes. A regulation device is provided for regulation of a drive of the secondary parts. The regulation device can regulate the drive of the first secondary part in a first zone of the primary part in accordance with a first regulation rule, and can regulate the drive of the second secondary part in a second zone of the primary part in accordance with a second regulation rule. The first and second regulation rules differ hereby from one another. The first zone is separated from the second zone by a boundary which can be varied dynamically by the regulation device.

9 Claims, 1 Drawing Sheet

(56) References Cited

U.S. PATENT DOCUMENTS 7,786,685 B2 * 8/2010 Schueren .................. 318/135
7,841,820 B2 * 11/2010 Bonora et al. ............ 414/217.1
7,841,824 B2 * 11/2010 Zobel et al. ................ 414/806

FOREIGN PATENT DOCUMENTS

| DE | 103 34 736 A1 | 2/2005 |
| EP | 1 845 428 A2 | 10/2007 |
| JP | H10236648 A | 9/1998 |

* cited by examiner

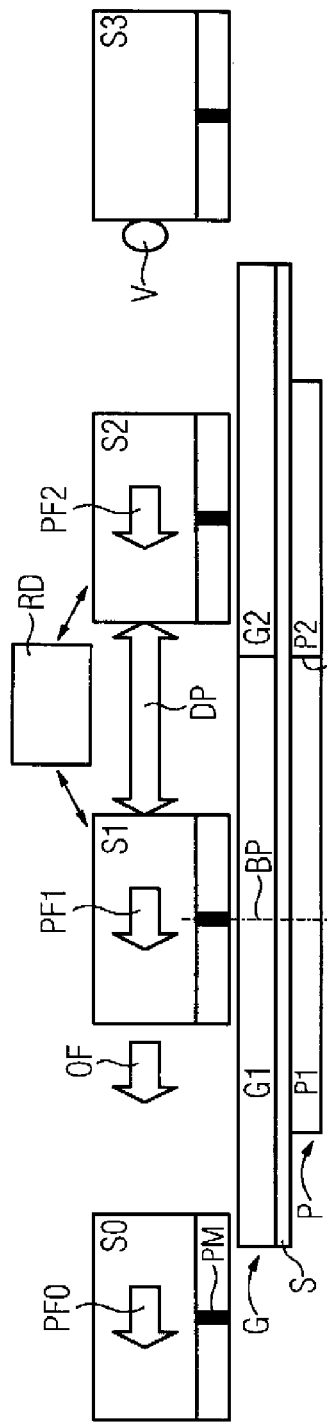
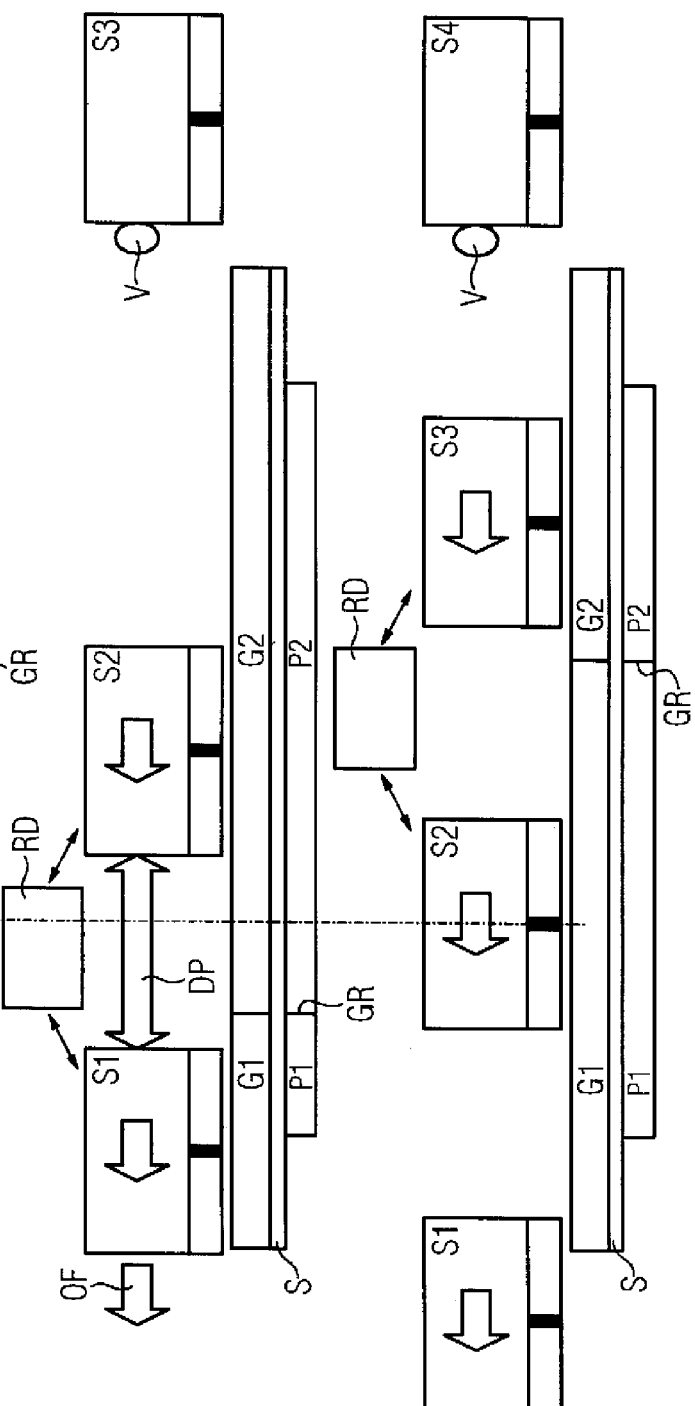
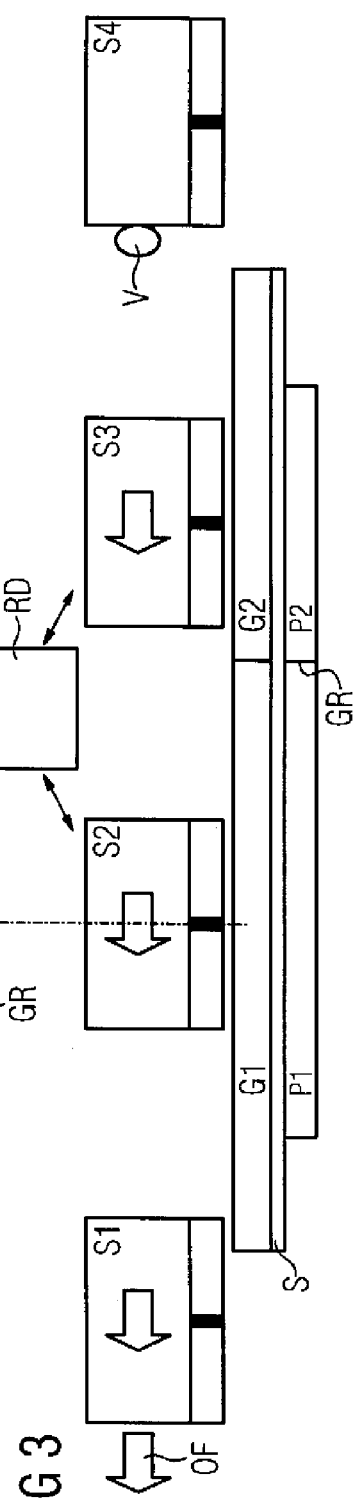

TRANSFER APPARATUS WITH DYNAMICALLY VARIABLE DRIVE ZONES

CROSS-REFERENCES TO RELATED APPLICATIONS

This application claims the priority of European Patent Application, Serial No. EP 08015870, filed Sep. 9, 2008, pursuant to 35 U.S.C. 119(a)-(d), the content of which is incorporated herein by reference in its entirety as if fully set forth herein.

BACKGROUND OF THE INVENTION

The present invention relates to a transfer apparatus having a primary part, at least one first or one second secondary part, which are each magnetically coupled to the primary part for drive purposes, and a regulation device for regulation of a drive of the secondary parts. The present invention also relates to a corresponding method for magnetic driving of at least one first and one second secondary part with a primary part.

The following discussion of related art is provided to assist the reader in understanding the advantages of the invention, and is not to be construed as an admission that this related art is prior art to this invention.

A transfer apparatus is used, for example, for transportation and precise positioning of workpiece carriers with workpieces arranged on them. A transfer apparatus such as this can also be used as part of and/or along a conveyor path. One or more processing stations and one or more positioning modules, suitably with a positioning drive by means of a linear motor, can be arranged along the conveyor path. Furthermore, a transfer apparatus may, however, also be used, for example, for transportation of goods or people, preferably in decentralized arrangements, over long distances and in network systems (transport systems of widely different types).

In conventional transfer apparatuses, for example having 3-phase motors, each phase group is hard-wired to a rigidly associated regulator. Motors arranged in series are regulated via an appropriately associated regulator in a respectively defined drive and transmitter zone. However, systems such as these have the disadvantage that every secondary part and every workpiece carrier must be associated with one fixed zone of the primary part, in order that it can be moved deliberately along the primary part. In some circumstances, this means that relatively long distances must be maintained between the individual secondary parts and workpiece carriers. In addition, all the secondary parts are moved along the primary part in accordance with a fixed predetermined regulation rule. In general, this allows only relatively poor positioning accuracy to be achieved.

It would therefore be desirable and advantageous to provide an improved transfer apparatus to obviate prior art shortcomings and to attain an increase in throughput while yet improving positioning accuracy.

SUMMARY OF THE INVENTION

According to one aspect of the present invention, a transfer apparatus includes a primary part, at least one first and one second secondary part, which are each magnetically coupled to the primary part in driving relationship, a regulation device for regulation of a drive of the secondary parts, wherein the regulation device is constructed to regulate the drive of the first secondary part in a first zone of the primary part in accordance with a first regulation rule, and to regulate the drive of the second secondary part in a second zone of the primary part in accordance with a second regulation rule, wherein the first and second regulation rules differ from one another; and a boundary separating the first zone from the second zone and variable dynamically by the regulation device.

According to another aspect of the present invention, a method for magnetic driving of at least one first and one second secondary part with a primary part includes the steps of regulating a drive of the first secondary part in a first zone of the primary part in accordance with a first regulation rule, regulating a drive of the second secondary part in a second zone of the primary part in accordance with a second regulation rule, wherein the first and second regulation rules differ from one another, and separating the first zone from the second zone by a boundary which is varied dynamically.

The dynamic movement of the boundaries of the drive zones of the primary part makes it possible to move a plurality of secondary parts along a single primary part independently of one another, and to also move the respective drive zones of the primary part with this movement. The distance between two secondary parts can therefore be shortened, and in consequence the throughput of the transfer apparatus can be increased. In principle, a secondary rod (without a gap) can also be moved at the same time (for example: goods-vehicle trains along a guide rail with goods vehicles as secondary parts, which are latched into or unlatched from the rod.

According to another advantageous feature of the present invention, a transmitter device can be attached to the primary part and can be subdivided, also dynamically, by the regulation device into a plurality of transmitter zones such that a first transmitter zone is associated with the first zone of the primary part, and a second transmitter zone is associated with the second zone of the primary part. As a result, a transmitter zone can electronically follow the movement of a secondary part. The dynamic movement of the drive and transmitter zones of a direct-motor system such as this makes it possible to provide an electronic feed with a secondary-part change.

The transmitter device may be based on a magnetic principle, and may supply absolute position information. In this case, it is advantageous for the secondary part or the tool carrier to have a permanent magnet whose position is detected in an absolute form by a sensor on the primary part side. For this purpose, for example, the position of a sensor piece, which is influenced by the permanent magnet, can be determined by means of a delay time measurement. This makes it possible to provide a simple and insensitive sensor system.

According to another advantageous feature of the present invention, the first secondary part can be moved at a same time as the second secondary part. The two secondary parts can be moved synchronously by the primary part. Since two or more secondary parts can be moved in one direction at the same time in this way, the distance between the two secondary parts can be reduced, for transport and processing. A backward movement of the drive zones takes place completely without any mechanical movement, with just one new drive zone of the primary part being associated with one secondary part. In this case, the regulators and regulation zones are synchronized. The movement process in the transfer apparatus according to the invention therefore corresponds to a worm feed, a toothed-belt or chain feed without return movement, or to a clocked feed with return movement. The dynamic movement of the drive and transmission zones requires only electronic switching of primary parts (coil groups) of the intrinsically hard-wired zones.

The boundary between two zones of the primary part can also be moved directly with movement of the first and/or second secondary part. Only a small unused area of the primary part therefore remains between two secondary parts.

According to another advantageous feature of the present invention, each secondary part can be moved in its zone of the primary part with a respectively individual position offset with respect to a predetermined position. This position offset relates, for example, to a specific workpiece carrier or to a specific workpiece on a workpiece carrier. The offset is then carried along or also taken into account throughout the entire movement of the secondary part or workpiece carrier in the respectively associated zone of the primary part. This allows the workpieces to be positioned more precisely over the entire transport zone.

According to another advantageous feature of the present invention, the first zone of the primary part can be associated by the regulation device with the second secondary part, in order to drive it, as soon as the first secondary part has left the primary part. The movement of the secondary parts in a specific zone of the primary part can therefore always be regulated in the same manner. If necessary, offset values can in this case be passed on to the appropriate zones.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows an outline sketch of a transfer apparatus according to the present invention;

FIG. 2 shows the transfer apparatus from FIG. 1 with further-transported secondary parts, and FIG. 3 shows the transfer apparatus shown in FIG. 2 after further transportation once again, and after receiving a new secondary part.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an outline sketch of a transfer apparatus according to the present invention. According to the example shown in FIG. 1, a direct-motor system with a primary part P is provided as a transfer apparatus. The primary part P is formed integrally and has a multiplicity of coils and permanent magnets along the transport direction (horizontal direction in FIG. 1). By way of example, the coils are combined into groups of three for a 3-phase motor. A transmitter G is mounted on the primary part P, and its signal is used for regulation of the transport movements. One or more regulators then control the coils of the primary part P in accordance with the signals from the transmitter G. In FIGS. 1 to 3, RD indicates a regulation device, S indicates a sensor and OF indicates a position offset.

In the shown non-limiting example, the transfer apparatus is integrated in a mechanical transport system. For example, one conveyor belt is located on each of the two end faces of the primary part P and transmitter G. These additional transport systems are not shown in FIGS. 1 to 3.

In this case, the workpiece carriers S0 to S1 are transported from right to left. On the left-hand side of the transfer apparatus or motor system, a secondary part S0 leaves the zone of the transmitter G or of the primary part P, as is indicated by the arrow PF0. Two secondary parts S1 and S2 are now located on or adjacent to the primary part P. They are moved by the primary part P corresponding to the arrows PF1 and PF2. A further secondary part S3 is not yet located in the influence area of the primary part P, and is held back by an initial stopper V.

In the present case, the transfer apparatus is shown in a plan view, with the secondary parts S0 to S3 each being L-shaped. A permanent magnet PM is arranged in each vertical wall of each secondary part, facing the primary part P or transmitter G.

The aim is to use the workpiece carriers or secondary parts S0 to S3 to transport the individual workpieces exactly to a processing position BP. This processing position is indicated by a dashed-dotted line in FIGS. 1 to 3. The permanent magnet of each secondary part S0 to S1 interacts with the transmitter G in order to regulate the movement. In the present case, the transmitter G produces an absolute position signal.

As shown by way of example, the two secondary parts S1 and S2 are located in the drive zone of the primary part P. In order to allow the two secondary parts S1 and S2 to be moved separately from one another, despite the common primary part P, they are each driven by their own regulators or regulator ranges. For this purpose, the primary part P and the transmitter G are likewise each split into two parts: P1 and P2 as well as G1 and G2. A common boundary GR, which runs at right angles to the direction of movement, separates the primary part P1, which is associated with the transmitter zone G1, from the primary part P2, which is associated with the transmitter zone G2. The zones P1 and G1 are used to drive the secondary part S1, and the zones G2 and P2 are used to drive the secondary part S2. The section of the zones P2 and G2 acts as a stopper or an inlet zone. It receives the secondary part S2 from the conveyor belt, and moves it to a predetermined position relative to a previous secondary part S1 or relative to the processing position BP, as is indicated by the double-headed arrow DP.

The drive which is provided by the zones G1 and P1 is used to move the secondary part S1. The secondary part S1 is moved to the processing position BP, remains there for a specific time, and is then transported further. Since the zones G1/P1 and G2/P2 are controlled by different regulators, the secondary parts S1 and S2 can be moved independently of one another. The drive with the zones G1/P1 is used primarily for the exact positioning of a workpiece on the processing position BP.

After the processing of the workpiece, the secondary part S1 is conveyed further to the left as shown in FIG. 2. In order to ensure that the secondary part S2 does not have to wait until the secondary part S1 has left the transfer apparatus, the boundary GR is moved to the left with the movement of the secondary part S1. The drive zone P2/G2 is therefore lengthened, and the drive zone G1/P1 shortened. The secondary part S2 can therefore follow the secondary part S1 at a short distance (cf. Double-headed arrow DP), and can be moved to the processing position BP. The zone G2/P2 now carries out the function of positioning at the processing position BP, and the zone G1/P1 carries out the function of outputting to a subsequent conveyor belt. The output and positioning take place at the same time.

FIG. 3 shows the secondary part S1 in a position after the output, and the secondary part S2 in the processing position BP. Since the primary part of the drive is split in two, the secondary part S3 can now be received in the inlet area of the primary part according to a first regulation rule, while the secondary part S2 is held in the processing position BP according to a second regulation rule. Thus, in the example in FIG. 3 the first regulation rule is to move a secondary part, in this case S3 within the primary part, and the second regulation rule is to hold a secondary part, in this case S2 in position within the primary part. For this purpose, the boundary GR between the drive zones must be dynamically reset. In principle, there are two possible ways to do this: either the dynamically varied zone G1/P1 is associated with the secondary part S2 and the zone G2/P2 with the secondary part S3, or else the zone G2/P2 remains associated with the secondary part S2 and the zone G1/P1 is associated with the secondary part S3. In the latter case, the zone G1/P1 is then located to the right of the zone G2/P2. In the end, the respective association is simply a question of logic.

The positions of the secondary parts in FIG. 3 correspond essentially to those in FIG. 1. Each individual secondary part has, however, been moved by one position to the left. A new secondary part S4 is therefore resting on the initial stopper V, while the secondary part S3, which in the meantime has been released by the initial stopper V, is now located in the stopper initial position in the right-hand part of the drive. The secondary part S2 is located in the positioning zone, and the secondary part S1 is located, as mentioned, in the output.

Thus, according to the invention, phase zone wiring of a second motor is connected at a defined time to a first regulator which, prior to this, regulates a first motor. This dynamic movement of the drive zones or regulation zones allows synchronization to be achieved between the secondary parts. This therefore allows synchronous movement of two secondary elements with approximately the same distance between them. This simulates a so-called "mechanical cam" (for example worm drive or rake drive) for simultaneous movement of two secondary elements by means of an "electronic cam".

After the synchronous movement, the boundaries of the drive and transmitter zones are dynamically reset once again, as a result of which resynchronization with a subsequent secondary part can be carried out effectively "smoothly".

The proposed system advantageously makes it possible to improve the position and repetition accuracy in comparison to known systems, by a factor of 10. A further advantage of this exact positioning system is that faults can be rectified more easily since the workpiece carrier is freely accessible, and can be removed from the system, in contrast to mechanical conveyance by means of a comb and/or rake.

A further advantage over purely mechanical movement forms is the short cycle, since no fixed distances or rigid synchronization positions are required. By way of example, better dynamics and accuracy can likewise be achieved in comparison to electronic worm feeds, since an offset calculation is carried out for mechanical manufacturing inaccuracies. This is because any position offsets can be passed on directly from a first regulation zone to a second regulation zone, as a result of which the distances and movements of the individual secondary parts can be carried out individually, as a function of the offset, throughout the entire passage through the transfer apparatus.

Since, with previously known solutions, it has not been possible to regulate two secondary elements at the same time in one motor zone, an idling time always had to be taken into account throughout the entire cycle. This means that a workpiece carrier need not be fed out of the positioning zone before a new workpiece carrier can be received in the positioning zone. Such "idling" is no longer necessary with the proposed solution, since the dynamic movement of the regulation zones allows synchronization of the movement of two workpiece carriers. This means that the workpiece carriers or secondary elements can also be changed at the same time as the positioning process.

The above examples relate to the transport of two workpiece carriers with the aid of a single primary part by dynamic movement of the regulation zones. However, the primary part can also be subdivided into more than two drive zones, as a result of which more than two workpiece carriers can be moved independently of one another and synchronized to one another, with a short distance between them. Furthermore, this transport system can also be used for transportation of goods and people.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transfer apparatus for transportation of an article, comprising:
   a primary part;
   at least one first and one second secondary part, which are each adapted for seating of an article and are magnetically coupled to the primary part for movement relative to each other along a direction of transport of the first and second secondary parts on the primary part;
   a transmitter attached to the primary part, said transmitter capable of receiving information regarding a position of the at least one first and second secondary parts on the primary part along the direction of transport and generating at least one signal indicative of said position; and
   a regulation device operatively coupled with the primary part for defining a boundary in the primary part to thereby subdivide the primary part into adjoining first and second zones along the direction of transport, and for regulating the movement of the at least one first and one second secondary parts as a function of the at least one signal generated by the transmitter, wherein the regulation device is constructed to dynamically move said boundary and to regulate the movement of the at least one first secondary part in the first zone in accordance with a first regulation rule, and to regulate the movement of the at least one second secondary part in the second zone in accordance with a second regulation rule, wherein the first and second regulation rules differ from one another.

2. The transfer apparatus of claim 1, wherein the transmitter is subdividable dynamically by the regulation device into a plurality of transmitter zones such that a first transmitter zone interacts with the first zone of the primary part, and a second transmitter zone interacts with the second zone of the primary part.

3. The transfer apparatus of claim 2, wherein the information regarding the position of the at least one first and second secondary parts on the primary part received by the transmitter is an absolute position information based on a magnetic principle.

4. The transfer apparatus of claim 2, further comprising a sensor on a side of the primary part, said sensor sensing said position of the at least one first and one second secondary parts along the direction of transport the transmitter, by detecting in an absolute form a position of a permanent magnet respectively provided on the at least one first and one second secondary parts and providing said position to the transmitter.

5. The transfer apparatus of claim 1, wherein the at least one first secondary part is movable at a same time as the second secondary part.

6. The transfer apparatus of claim 1, wherein the boundary is movable jointly with a movement of at least one of the at least one first and second secondary parts.

7. The transfer apparatus of claim 1, wherein each of the at least one first and one second secondary parts is movable in its zone of the primary part with a respectively individual position offset with respect to a predetermined position.

8. The transfer apparatus of claim 1, wherein the at least one first and one second secondary parts are movable in synchronism by the primary part.

9. The transfer apparatus of claim 1, wherein the first zone of the primary part is caused to interact by the regulation device with the at least one second secondary part to drive the at least one second secondary part as soon as the at least one first secondary part has left the primary part.

* * * * *